US009507597B2

(12) United States Patent
Hooker et al.

(10) Patent No.: US 9,507,597 B2
(45) Date of Patent: Nov. 29, 2016

(54) SELECTIVE ACCUMULATION AND USE OF PREDICTING UNIT HISTORY

(71) Applicant: VIA TECHNOLOGIES, INC., New Taipei (TW)

(72) Inventors: Rodney E. Hooker, Austin, TX (US); Terry Parks, Austin, TX (US); John Michael Greer, Austin, TX (US)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 461 days.

(21) Appl. No.: 14/165,354

(22) Filed: Jan. 27, 2014

(65) Prior Publication Data

US 2014/0365753 A1   Dec. 11, 2014

Related U.S. Application Data

(60) Provisional application No. 61/833,044, filed on Jun. 10, 2013.

(51) Int. Cl.
G06F 9/00 (2006.01)
G06F 9/30 (2006.01)
G06F 9/38 (2006.01)

(52) U.S. Cl.
CPC ......... G06F 9/30058 (2013.01); G06F 9/3848 (2013.01); G06F 9/3851 (2013.01)

(58) Field of Classification Search
CPC .......................... G06F 9/30058; G06F 9/3848
See application file for complete search history.

(56) References Cited

U.S. PATENT DOCUMENTS

| 4,679,141 | A | 7/1987 | Pomerene et al. |
| 2004/0111548 | A1 | 6/2004 | Arimilli et al. |
| 2004/0215720 | A1 | 10/2004 | Alexander et al. |
| 2011/0320793 | A1* | 12/2011 | Bell, Jr. ............... G06F 9/5011 712/240 |
| 2015/0212822 | A1 | 7/2015 | Hooker et al. |

FOREIGN PATENT DOCUMENTS

EP   0855646 A2   7/1998

* cited by examiner

Primary Examiner — Zachary K Huson
(74) Attorney, Agent, or Firm — E. Alan Davis; James W. Huffman

(57) ABSTRACT

A microprocessor includes a predicting unit and a control unit. The control unit controls the predicting unit to accumulate a history of characteristics of executed instructions and makes predictions related to subsequent instructions based on the history while the microprocessor is running a first thread. The control unit also detects a transition from running the first thread to running a second thread and controls the predicting unit to selectively suspend accumulating the history and making the predictions using the history while running the second thread. The predicting unit makes static predictions while running the second thread. The selectivity may be based on the privilege level, identity or length of the second thread, static prediction effectiveness during a previous execution instance of the thread, whether the transition was made due to a system call, and whether the second thread is an interrupt handler.

29 Claims, 4 Drawing Sheets

SELECTIVE ACCUMULATION AND USE OF PREDICTING UNIT HISTORY

CROSS REFERENCE TO RELATED APPLICATION(S)

This application claims priority based on U.S. Provisional Application Ser. No. 61/833,044, filed Jun. 10, 2013, entitled SELECTIVE ACCUMULATION AND USE OF PREDICTING UNIT HISTORY, which is hereby incorporated by reference in its entirety.

BACKGROUND

Modern microprocessors employ various prediction techniques to improve their performance. For example, branch predictors predict whether branch instructions will be taken or not taken and, if taken, predict the target address of the branch instruction. Dynamic branch predictors accumulate a history of outcomes of different branch instruction executions and make their predictions based on the history. The prediction accuracy of a dynamic branch predictor is largely a function of the amount of history it is capable of accumulating. As long as the set of branch instructions that are being executed by a program within a given time is small enough to be contained within the prediction history, the accuracy may be very high.

However, the prediction accuracy may be greatly diminished by certain events. One such event is when the currently running program is interrupted temporarily while another program runs. For example, a packet may be received by a network interface controller, which signals an interrupt to the processor. The processor transfers control to the operating system to service the interrupt, which temporarily suspends the currently running program A until the operating system returns control back to running program A. While the processor is executing branch instructions of the operating system, it is polluting the prediction history in the branch predictor for program A. This is likely to diminish the accuracy of the branch predictor for predicting branches of program A.

BRIEF SUMMARY

In one aspect the present invention provides a microprocessor. The microprocessor comprising a predicting unit and a control unit. The control unit is configured to control the predicting unit to accumulate a history of characteristics of instructions executed by the microprocessor and make predictions related to subsequent instructions based on the history while the microprocessor is running a first thread. The control unit is further configured to detect a transition from running the first thread to running a second thread distinct from the first thread. The control unit is further configured to control the predicting unit to selectively suspend accumulating the history and making the predictions using the history while running the second thread.

In another aspect, the present invention provides a method for operating a microprocessor. The method includes accumulating a history of characteristics of instructions executed by the microprocessor and making predictions related to subsequent instructions based on the history while the microprocessor is running a first thread. The method also includes detecting a transition from running the first thread to running a second thread distinct from the first thread. The method also includes selectively suspending accumulating the history and making the predictions using the history while running the second thread.

In yet another aspect, the present invention provides a computer program product encoded in at least one non-transitory computer usable medium for use with a computing device, the computer program product comprising computer usable program code embodied in said medium, for specifying a microprocessor. The computer usable program code includes first program code for specifying a predicting unit and second program code for specifying a control unit. The control unit is configured to control the predicting unit to accumulate a history of characteristics of instructions executed by the microprocessor and make predictions related to subsequent instructions based on the history while the microprocessor is running a first thread. The control unit is further configured to detect a transition from running the first thread to running a second thread distinct from the first thread. The control unit is further configured to control the predicting unit to selectively suspend accumulating the history and making the predictions using the history while running the second thread.

DETAILED DESCRIPTION OF THE EMBODIMENTS

Figure 1:
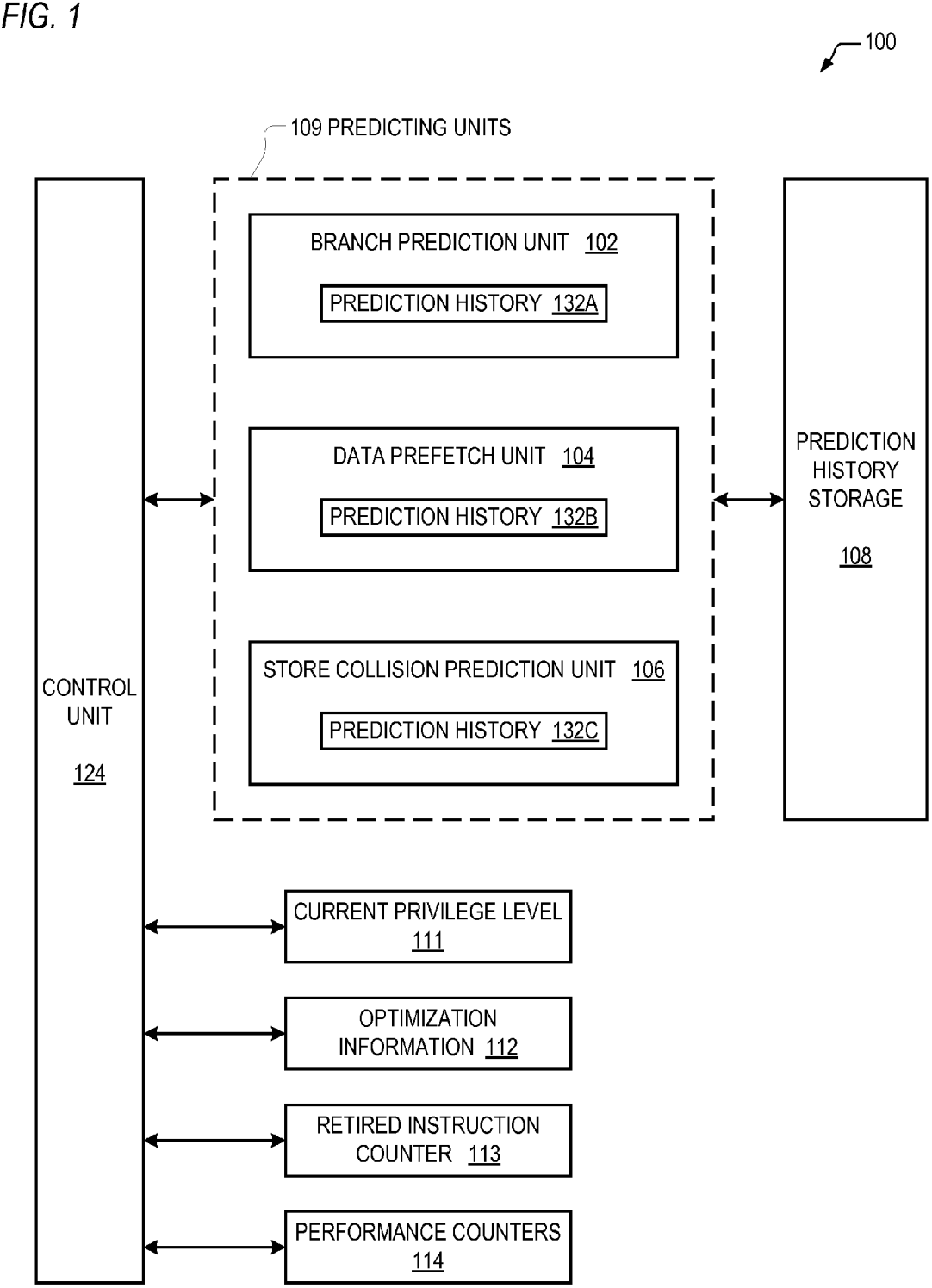
FIG. 1 is a block diagram of a microprocessor.

Embodiments are described that may improve the performance of a microprocessor by selectively suspending accumulation of prediction history and prediction by predicting units (such as branch predictors, data prefetchers and store collision detection predictors) using the prediction history in favor of using static predictions while the dynamic predictions are suspended. More specifically, prediction history accumulation and use may be suspended while the microprocessor is running some threads but not others. For example, the suspension may be selective based on the privilege level at which the thread runs, more specifically, whether or not the thread runs at a supervisor privilege level, such as current privilege level (CPL) zero of an x86 architecture processor, which is also referred to as ring 0. For another example, the suspension may be selective based on the type of thread, such as whether the thread is an interrupt handler. For yet another example, the suspension may be selective based on whether the transition to a new thread was made in response to a system call instruction. For still another example, the microprocessor gathers information about previous execution instances of threads and the suspension may be selective based on the information, such as instruction length and performance information. For an additional example, the suspension may be selective based on the identity of the thread. The thread identity may be determined based on the type of event that caused the transition, architectural state of the processor when the event happened, and a combination thereof, for example. The event types may include execution of a system call, execution of a software interrupt instruction, execution of an inter-privilege or task switch procedure call and detection of an exception condition, for example. Still further, the microprocessor may save and restore the prediction histories to a local storage during the suspension of prediction history accumulation and use.

Glossary

A predicting unit is hardware, software, or a combination of hardware and software of a microprocessor that makes predictions about actions that a stream of instructions running on the microprocessor will take. The predictions may include, but are not limited to, a prediction of whether a branch instruction will instruct the microprocessor to branch; a prediction of a target address of a branch instruction; a prediction of data that will be accessed by an instruction of the stream; a prediction of whether a store collision will occur. The predicting unit makes predictions based on a history of characteristics of instructions executed by the microprocessor, which predictions are referred to as dynamic predictions. The predicting unit accumulates the history as the microprocessor executes instructions of the stream. The history may include, but is not limited to, an outcome of whether a branch instruction instructed the microprocessor to branch; a target address of a taken branch instruction; addresses of data that was loaded or stored by instructions of the stream; information related to store instructions that specify cacheable memory locations, such as the address of the store instruction, identifiers of the sources used to calculate the store address, a reorder buffer index of an instruction upon which the store data depends, the address and reorder buffer index of a load instruction that previously collided with the store instruction, a reorder buffer index delta between colliding load and store instructions, an indicator of the number of times a colliding load instruction was replayed. The predicting unit may also make predictions not based on the history, which predictions are referred to as static predictions.

A privilege level of a microprocessor is defined by the microprocessor's instruction set architecture and controls the access of a currently running program to system resources, such as memory regions, I/O ports and certain instructions of the instruction set.

A thread is a sequence of instructions that are executed by a microprocessor.

A process is a thread and its associated state that is managed, along with other processes, by an operating system. The operating system assigns a process identifier to the process.

Referring now to FIG. 1, a block diagram of a microprocessor 100 is shown. The microprocessor 100 includes predicting units 109. The predicting units 109 are coupled to a control unit 124 and a prediction history storage 108. The control unit 124 is coupled to a retired instruction counter 113, performance counters 114, a current privilege level register 111, and storage for holding optimization information 112. In one embodiment, the microprocessor 100 includes one or more pipelines of functional units (not shown), including an instruction cache, instruction translation unit or instruction decoder, register renaming unit, reservation stations, data caches, execution units, memory subsystem and a retire unit including a reorder buffer. Preferably, the microprocessor 100 includes a superscalar, out-of-order execution microarchitecture. The predicting units 109 may be incorporated into the various functional units of the microprocessor 100 or may be functional units themselves.

The predicting units 109 comprise hardware, software, or a combination or hardware and software. The predicting units 109 include a branch prediction unit 102 comprising a storage array for storing a prediction history 132A, a data prefetch unit 104 comprising a storage array for storing a prediction history 132B, and a store collision prediction unit 106 comprising a storage array for storing a prediction history 132C. The prediction histories are referred to either individually or collectively as prediction history 132 or prediction histories 132, respectively. The predicting units 109 use their respective prediction histories 132 to make predictions about various aspects of instruction/data processing in order to attempt to improve the performance and/or reduce the power consumption of the microprocessor 100 through speculative operation. More specifically, the branch prediction unit 102 accumulates a history of the instruction address, direction (taken or not taken), and target address of branch instructions executed by the microprocessor 100 to enable the branch prediction unit 102 to dynamically predict the direction and target address of subsequent execution instances of the branch instructions. Dynamic branch prediction techniques are well known in the art of branch prediction. The data prefetch unit 104 accumulates a history of accesses to cacheable memory regions by program instructions in order to detect memory access patterns that it uses to predict which data from the cacheable memory regions will be accessed by the program in the future in order to prefetch the predicted data from system memory into a cache memory of the microprocessor 100 before the program requests the data in order to reduce the memory access time (since system memory latency is much greater than cache memory latency). Dynamic data prefetch techniques are well known in the art of data prefetching. The store collision prediction unit 106 accumulates a history of store instructions that specify cacheable memory locations in order to predict when a store collision will occur. A store collision occurs when a newer load instruction specifies data that overlaps data of an older store instruction. Predicting a store collision may enable the microprocessor 100 to speculatively forward data from the store instruction to the load instruction and/or to avoid executing a colliding load instruction out-of-order with respect to the older store instruction. It should be understood that the embodiments are not limited to these particular types of predicting units, but may include other types of predicting units that accumulate a history of characteristics of instructions as they are executed by the microprocessor 100 that are useful in enabling the predicting unit to make predictions about aspects of subsequently executed instructions or perform other speculative operations to attempt to increase the performance of the microprocessor 100 and/or reduce its power consumption.

In addition to the dynamic predictions made by each of the predicting units 109, i.e., the predictions made using the prediction histories 132, each of the predicting units 109 is also configured to make static predictions, i.e., predictions made without the use of the prediction histories 132. For example, in one embodiment, the branch prediction unit 102 statically predicts all branch instructions whose target address is backward (e.g., a relative branch whose offset is a negative value) will be taken and all branch instructions whose target address is forward will be not taken, which does not require any history of previously executed instructions. For another example, in one embodiment, the data prefetch unit 104 statically predicts that when it detects a program accesses cacheable memory, the next sequential cache line of data will be needed, so it prefetches the next sequential cache line of data. Static prediction methods are also well known in the art of central processing units.

In one embodiment, the prediction history storage 108 is used by the predicting units 109 to save the prediction histories 132 in response to an event that causes the microprocessor 100 to transition from running one thread to running a different thread, such as a transition from a user privilege level to supervisor privilege level, and to restore the prediction histories 132 in response to an event that causes the microprocessor 100 to transition from the supervisor to privilege level back to a user privilege level, preferably if returning to a different user process than was running when the transition to supervisor privilege level was performed, as described in more detail below.

The current privilege level register 111 stores the current privilege level of the microprocessor 100. In embodiments in which the microprocessor 100 substantially conforms to the x86 architecture, otherwise known as the Intel IA-32 Architecture and/or Intel 64 Architecture, which is effectively described in the Intel 64 and IA-32 Architectures Software Developer's Manual, Combined Volumes: 1, 2A, 2B, 2C, 3B and 3C, Order Number 325464-043US, May 2012, by the Intel Corporation of Santa Clara, Calif. In particular, in an x86 embodiment, the current privilege level register 111 indicates whether the microprocessor 100 is running at current privilege level 0, 1, 2 or 3, i.e., in ring 0, ring 1, ring 2 or ring 3. Ring 0 is the most privileged level, and ring 3 is the least privileged level (user privilege level). Rings 0, 1 and 2 are supervisor privilege levels.

The retired instruction counter 113 increments each time an instruction is retired. By subtracting the instruction counter 113 value when the microprocessor 100 begins running a thread, e.g., enters ring 0, from the instruction counter 113 value when the microprocessor 100 begins running a different thread, e.g., exits ring 0, the control unit 124 may determine how many instructions were retired by the thread, as described in more detail below. In one embodiment, the instruction counter 113 counts the number of macroinstructions retired (i.e., architectural instructions, such as x86 instructions), whereas in another embodiment the instruction counter 113 counts the number of microinstructions retired (i.e., non-architectural instructions defined by the microarchitecture instruction set of the microprocessor 100 into which the macroinstructions are translated by an instruction translator of the microprocessor 100 and that are executed by the execution units of the microprocessor 100).

The performance counters 114 comprise a plurality of counters that count many aspects related to the performance and/or power consumption of the microprocessor 100. In one embodiment, the performance counters 114 count predicted branch instructions; correctly predicted branch instructions; incorrectly predicted branch instructions; cache lines allocated by a data prefetch; cache lines allocated by a non-prefetch mechanism, such as a demand load/store or direct memory access (DMA) request; program accesses to a cache line allocated by a data prefetch; cache lines allocated by a data prefetch that is evicted before it is used; store collision predictions; actual store collisions detected.

Figure 3:
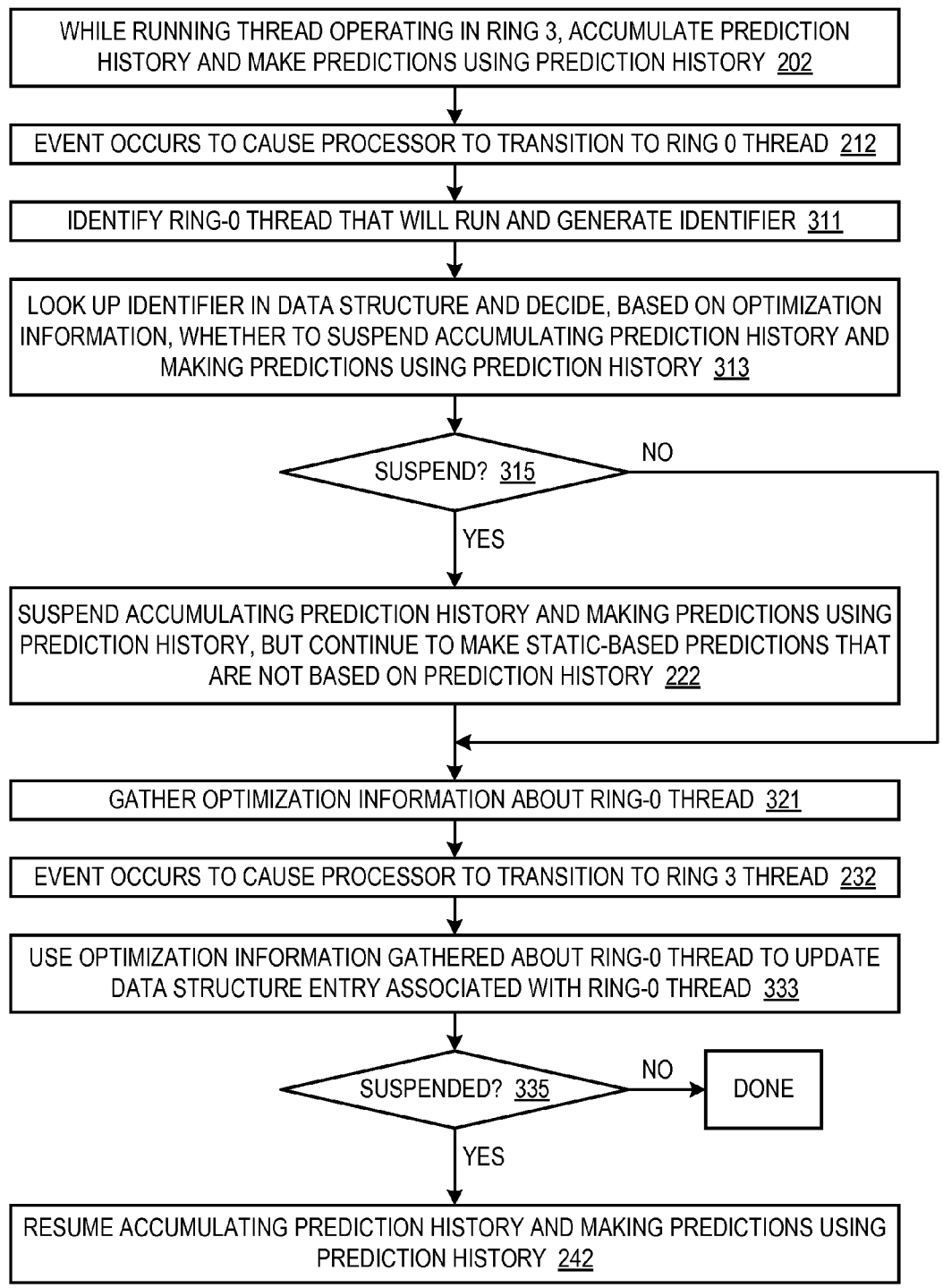
FIG. 3 is a flowchart illustrating operation of the microprocessor of FIG. 1 according to an alternate embodiment.

The optimization information 112 is used to selectively suspend accumulation and use of the prediction histories 132, e.g., during supervisor level operation, as described in more detail herein, particularly with respect to the embodiment of FIG. 3.

The control unit 124 comprises hardware, software, or a combination or hardware and software. Based on its inputs—primarily the current privilege level 111, the optimization information 112, the retired instruction counter 113, the performance counters 114, thread transition event types, and architectural state—the control unit 124 controls the predicting units 109 to continue or to suspend accumulating their respective prediction histories 132 and making predictions using the prediction histories 132 and/or to save/restore the prediction histories 132 to/from the predictor history store 108. In one embodiment, the control unit 124 comprises hardware state machines, microcode or a combination of hardware state machines and microcode. In one embodiment, the microcode comprises instructions that are executed by the execution units of the microprocessor 100.

In one embodiment, a microcode unit (not shown) that controls fetching of the microcode includes its own fetch unit, or sequencer, and does not employ the branch prediction unit 102, which predicts user program branch instructions only.

Figure 2:
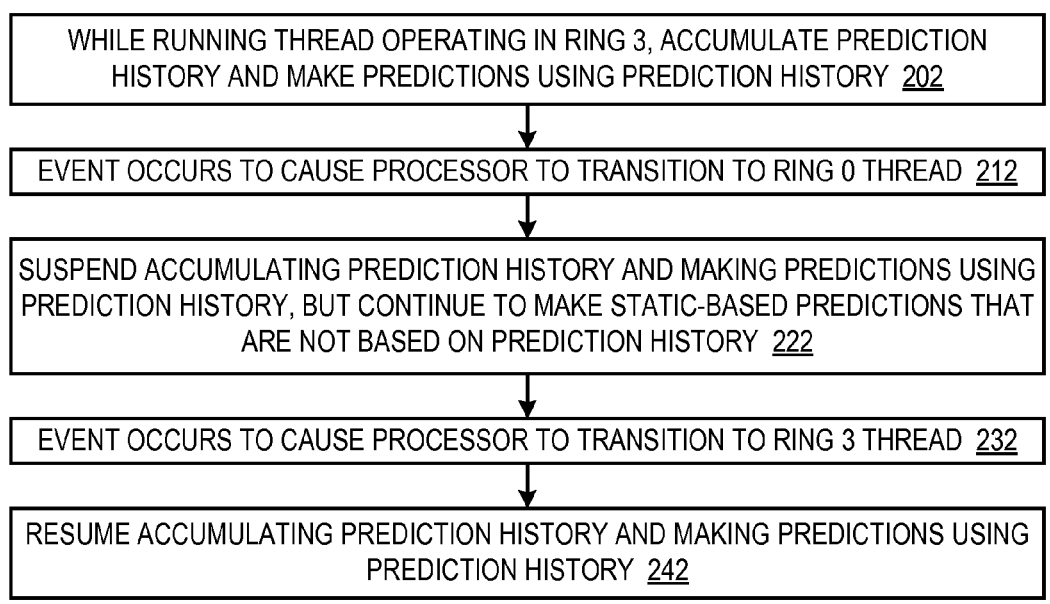
FIG. 2 is a flowchart illustrating operation of the microprocessor of FIG. 1.

Referring now to FIG. 2, a flowchart illustrating operation of the microprocessor 100 of FIG. 1 is shown. Flow begins at block 202.

At block 202, while running a thread operating at a user privilege level, e.g., ring 3, each of the predicting units 109 accumulates its respective prediction history 132 and makes dynamic predictions using the prediction history 132 as the microprocessor 100 is processing instructions of the thread. Flow proceeds to block 212.

At block 212, the control unit 124 detects an event that instructs the microprocessor 100 to operate at a supervisor privilege level, e.g., ring 0. The event also causes the microprocessor 100 to transfer control to a different thread than the currently running thread. Examples of the event include, but are not limited to execution of an instruction, such as a system call instruction (e.g., x86 SYSENTER/SYSCALL instruction), a software interrupt (e.g., x86 INT instruction), or inter-privilege level or task switch procedure call instruction (e.g., x86 CALL instruction); and detection of an exception condition, such as a hardware interrupt (e.g., a timer tick, an I/O device) or page fault. In one embodiment, the event causes the microprocessor 100 to transfer control to the microcode, which performs various operations (e.g., permissions checks) before transferring control to the ring-0 thread, or routine, of the operating system that will handle the event. Flow proceeds to block 222.

At block 222, in response to the event detected at block 212, the control unit 124 controls the predicting units 109 to suspend accumulating their respective prediction histories 132 and making predictions using the prediction history while the microprocessor 100 is running the new thread at the supervisor privilege level. However, the predicting units 109 continue to make static predictions that do not require use of the prediction histories 132. In one embodiment, the control unit 124 may suspend accumulating prediction history 132 and making predictions with respect to some of the predicting units 109 but may not suspend the accumulating and making predictions for others. Furthermore, the decision regarding which predicting units 109 to suspend and which not to suspend may be dynamic as the microprocessor 100 operates. For example, the subsets of suspending and non-suspending predicting unit 109 may be programmable, such as by the operating system or BIOS. For another example, the subsets may be configurable via fuses that may be blown during manufacturing of the microprocessor 100 or in the field, either by a user or by service personnel. For another example, the subsets may be determined based on the particular ring-0 thread that will run, such as described below with respect to the embodiment of FIG. 3. Flow proceeds to block 232.

At block 232, the control unit 124 detects an event that instructs the microprocessor 100 to operate at a user privilege level, e.g., ring 3. The event also causes the microprocessor 100 to transfer control to a different thread than the currently running thread. Examples of the event include, but are not limited to, execution of an instruction, such as a system call return instruction (e.g., x86 SYSEXIT/SYSRET instruction), a return from interrupt or exception (e.g., x86 IRET instruction), or inter-privilege level return from procedure instruction (e.g., x86 RET instruction). In one embodiment, the event causes the microprocessor 100 to transfer control to the microcode, which performs various operations before transferring control to the ring-3 process. Flow proceeds to block 242.

At block 242, the predicting units 109 resume accumulating their respective prediction histories 132 and making dynamic predictions using the prediction history 132 as the microprocessor 100 is processing instructions. Flow ends at block 242.

As may be observed, if the ring-3 process to which control is returned at block 242 is the same ring-3 process that was interrupted by the event at block 212, then the prediction histories 132 should be the same as they were prior to the ring-0 transition, i.e., what they were when the ring-3 process was interrupted, since they are not being polluted by the ring-0 thread. Therefore, it is highly likely that the predicting units 109 will advantageously continue to make as accurate dynamic predictions for the threads of the ring-3 process after the event as before. It is also likely that the prediction performance when executing the ring-0 thread will be less than the prediction performance when executing the ring-3 process since only static prediction will be used for the ring-0 thread predictions. However, depending upon the characteristics of the ring-0 thread and/or ring-3 process, it may be advantageous to sacrifice performance when executing the ring-0 thread in hopes that the ring-3 performance improvement—due to less or no pollution of the ring-3 process prediction history—will dominate the loss in ring-0 performance, particularly if the ring-0 thread is short and/or infrequently run.

Referring now to FIG. 3, a flowchart illustrating operation of the microprocessor 100 of FIG. 1 according to an alternate embodiment is shown. Several blocks of FIG. 3 are the same as blocks of FIG. 2 and are identically numbered. Preferably, at reset, the control unit 124 initializes the optimization information 112 data structure described in more detail below. Flow begins at block 202.

At block 202, while a thread operating at a user privilege level, e.g., ring-3, each of the predicting units 109 accumulates its respective prediction history 132 and makes dynamic predictions using the prediction history 132 as the microprocessor 100 is processing instructions. Flow proceeds to block 212.

At block 212, the control unit 124 detects an event that instructs the microprocessor 100 to operate at a supervisor privilege level, e.g., ring-0, and causes the microprocessor 100 to transfer control to a different thread than the currently running thread. Flow proceeds to block 311.

At block 311, the control unit 124 attempts to identify the thread that will run at ring-0 and generates an identifier for the ring-0 thread. In one embodiment, the optimization information 112 data structure described below comprises a table kept by the control unit 124 in a private memory of the microprocessor 100. Each entry in the table is associated with a different ring-0 thread identifier. The function employed to generate the ring-0 thread identifier may receive various inputs such as the event type and state values of the microprocessor 100 when the thread transition is detected. The event type may be one of the various event types described above with respect to block 212 of FIG. 2, but is not limited to those examples. The state values may be general purpose register values, model specific register values, the instruction pointer (IP) or program counter (PC) value of the ring-3 process that made a system call, software interrupt, inter-privilege or task switch procedure call, and the interrupt vector number associated with the interrupt or exception, but is not limited to these examples. The state value inputs may vary depending upon the event type. For example, it has been observed that when ring-3 processes make a system call (e.g., via the x86 SYSENTER instruction) to the Microsoft® Windows® operating system, Windows runs different threads depending upon the value in the x86 EAX register and, in some instances, the value of other registers. Hence, in one embodiment, when the event type is a system call instruction, the control unit 124 examines the value of the EAX register and generates different ring-0 identifiers for the different EAX values. Other embodiments are contemplated for other operating systems. For another example, the control unit 124 may generate different ring-0 identifier values for the different interrupt vector values. Flow proceeds to block 313.

At block 313, the control unit 124 looks up the ring-0 identifier generated at block 311 in the optimization information 112 data structure to obtain the optimization information 112 associated with the ring-0 thread identified by the ring-0 identifier. In one embodiment, if the ring-0 identifier is not present in the optimization information 112 data structure, the control unit 124 performs the default ring-0 entry action (i.e., the default action associated with entry into ring-0 with respect to whether or not to accumulate prediction history 132 and makes dynamic predictions using the prediction history 132) and allocates an entry in the optimization information 112 data structure for the ring-0 identifier. In one embodiment, the default ring-0 entry action is to suspend accumulating prediction histories 132 and using them to make predictions. If the ring-0 identifier is present, the control unit 124 decides whether to override the default ring-0 entry action based on the associated optimization information 112. In one embodiment, the optimization information 112 comprises a length associated with the ring-0 thread and the control unit 124 decides to suspend accumulating and using the prediction histories 132 if the length of the ring-0 thread is less than a predetermined length, and otherwise to continue accumulating and using the prediction histories 132. In one embodiment, the length is represented as the number of instructions retired during a previous run of the ring-0 thread, which is obtained using the retired instruction counter 113. In one embodiment, the optimization information 112 comprises information about the effectiveness of the predictions made based on the prediction histories 132 during a previous execution instance of the ring-0 thread and/or during a previous run of the ring-3 process subsequent to the previous execution instance of the ring-0 thread. In one embodiment, the effectiveness is obtained using the performance counters 114. Flow proceeds to decision block 315.

At decision block 315, the control unit 124 decides whether to suspend accumulating the prediction histories 132 and using them to make predictions. If so, flow proceeds to block 222; otherwise, flow proceeds to block 321. Although embodiments are described in which the decision whether or not to accumulate prediction history 132 and make dynamic predictions using the prediction history 132 is made based on the optimization information 112 associated with a thread identifier, the decision may be made by criteria. For example, the control unit 124 may make the decision based on the identity, or characteristics, of the new thread (using any combination of the various inputs described) to which the running transition is made without reference to the optimization information 112. That is, the characteristics of the new thread (e.g., event type and/or architectural state associated with the transition to the new thread; privilege level, as described with respect to FIG. 2, for example; or whether the new thread is an interrupt handler) may be sufficient to base the decision whether or not to accumulate prediction history 132 and make dynamic predictions using it, i.e., whether to selectively suspend accumulating the prediction history 132 and making dynamic predictions using it. Generally speaking, the approach is to suspend accumulating the prediction history 132 and making dynamic predictions using it for threads that are significantly short and/or infrequently run since it is likely that running threads with those characteristics with poorer prediction accuracy in exchange for not polluting the prediction histories 132 of other significantly long and/or frequently run threads will result in higher prediction accuracy for the other threads and overall higher performance of the microprocessor 100.

At block 222, in response to the event detected at block 212, the control unit 124 controls the predicting units 109 to suspend accumulating their respective prediction histories 132 and making predictions using the prediction history while the microprocessor 100 is running at the supervisor privilege level. However, the predicting units 109 continue to make static predictions that do not require use of the prediction histories 132. Flow proceeds to block 321.

At block 321, while the ring-0 thread is running, the control unit 124 continuously gathers optimization information about the ring-0 thread, such as prediction effectiveness via the performance counters 114 and thread length from the retired instruction counter 113. In one embodiment, the control unit 124 gathers prediction effectiveness regarding static predictions in addition to dynamic predictions made by the predicting units 109. In one embodiment, the control unit 124 also gathers prediction effectiveness information for ring-3 threads. Preferably, if the performance of the statically-predicted thread is acceptable, then the control unit 124 may continue to suspend prediction history accumulation and use when the thread is running, particularly if the performance of other threads is significantly improved; otherwise, the control unit 124 may accumulate and use the prediction history when the thread is running. Flow proceeds to block 232.

At block 232, the control unit 124 detects an event that instructs the microprocessor 100 to operate at a user privilege level, e.g., ring 3, and to transfer control to a different thread than the currently running thread. Flow proceeds to block 333.

At block 333, the control unit 124 uses the optimization information gathered at block 321 to update the optimization information 112 data structure entry associated with the ring-0 thread. In one embodiment, the update comprises simply replacing the optimization information 112 in the entry with the newly gathered optimization information. In other embodiments, the update involves making calculations using the gathered optimization information and updating the optimization information 112 using the calculations. For example, the control unit 124 may calculate an average of the number of retired instructions and/or prediction effectiveness based on the last N executions of the ring-0 thread. Furthermore, the average may be a weighted or rolling average. Additionally, the control unit 124 may filter out extreme values for exclusion from the optimization information 112. Furthermore, various ways of maintaining the optimization information 112 data structure are contemplated. For example, in one embodiment, the control unit 124 only keeps entries in the optimization information 112 data structure for ring-0 threads for which the control unit 124 wants to override the default ring-0 entry action; that is, if the control unit 124 looks up the ring-0 thread identifier at block 313 and finds it in the optimization information 112 data structure, then the control unit 124 decides at decision block 315 to override the default action. Flow proceeds to decision block 335.

At decision block 335, the control unit 124 determines whether accumulating and using the prediction histories 132 was suspended at block 222. If so, flow proceeds to block 242; otherwise, the predicting units 109 have been accumulating and continue to accumulate prediction histories 132 and use them to make predictions, and flow ends.

At block 242, the predicting units 109 resume accumulating their respective prediction histories 132 and making dynamic predictions using the prediction history 132 as the microprocessor 100 is processing instructions. Flow ends at block 242.

Figure 4:
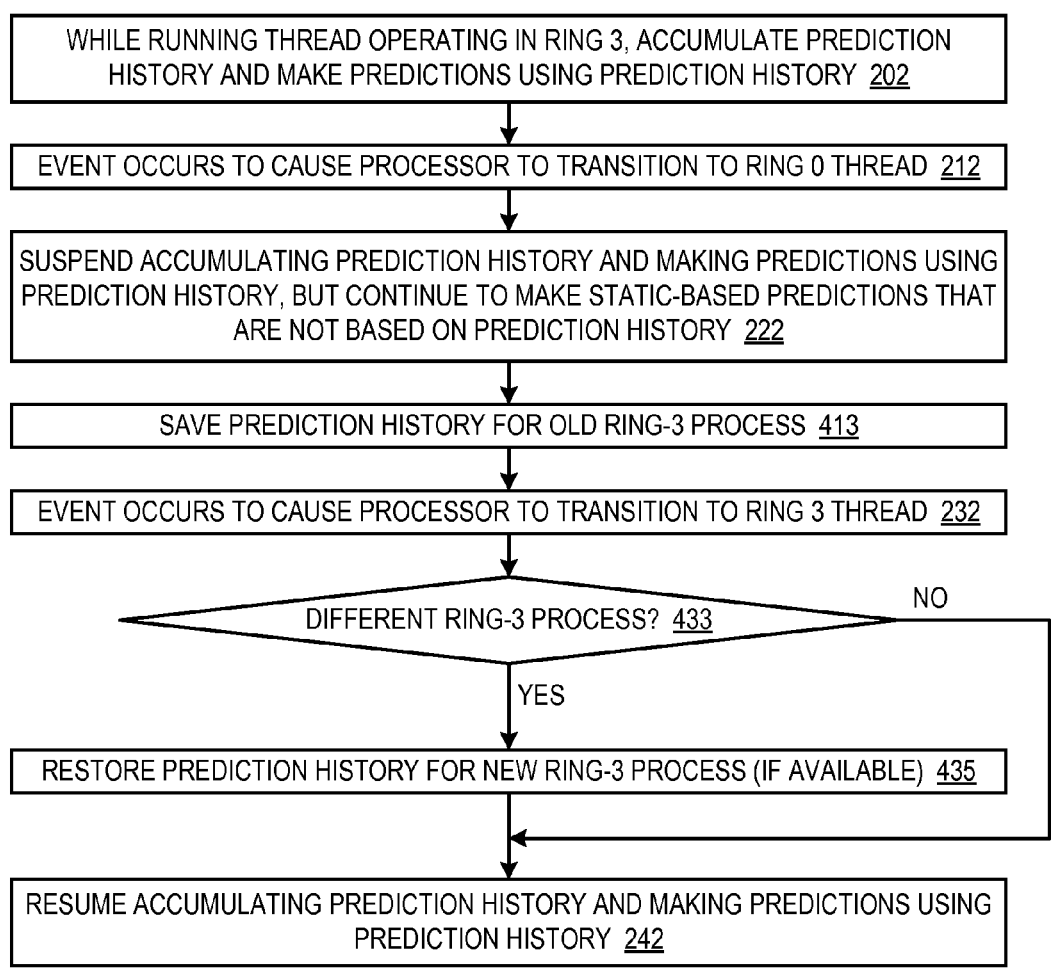
FIG. 4 is a flowchart illustrating operation of the microprocessor of FIG. 1 according to an alternate embodiment.

Referring now to FIG. 4, a flowchart illustrating operation of the microprocessor 100 of FIG. 1 according to an alternate embodiment is shown. Several blocks of FIG. 4 are the same as blocks of FIG. 2 and are identically numbered. Flow begins at block 202.

At block 202, while a thread operating at a user privilege level, e.g., ring-3, each of the predicting units 109 accumulates its respective prediction history 132 and makes dynamic predictions using the prediction history 132 as the microprocessor 100 is processing instructions. Flow proceeds to block 212.

At block 212, the control unit 124 detects an event that instructs the microprocessor 100 to operate at a supervisor privilege level, e.g., ring-0, and causes the microprocessor 100 to transfer control to a different thread than the currently running thread. Flow proceeds to block 222.

At block 222, in response to the event detected at block 212, the control unit 124 controls the predicting units 109 to suspend accumulating their respective prediction histories 132 and making predictions using the prediction history while the microprocessor 100 is running the new thread at the supervisor privilege level. However, the predicting units 109 continue to make static predictions that do not require use of the prediction histories 132. Flow proceeds to block 413.

At block 413, the control unit 124 stores the current instance of the prediction histories 132 to the prediction history storage 108. In one embodiment, the control unit 124 saves only a portion of a given prediction history 132 in order to reduce the amount of time required to perform the save. For example, if the prediction history 132A of the branch prediction unit 102 is relatively large (e.g., 8 KB), the control unit 124 may save only the most recently accessed entries (e.g., 512 bytes) rather than the entire prediction history 132A. In one embodiment, the control unit 124 invalidates the unsaved portions of the prediction histories 132. Furthermore, in one embodiment, the control unit 124 saves the prediction history 132 for only some of the predicting units 109, but not all of them. For example, if it is determined that the prediction effectiveness of a first subset of the predicting units 109 is much more greatly adversely affected when interrupted by a ring-0 thread than a second subset of the predicting units 109, then the control unit 124 may save the prediction histories 132 of the first subset but not the second. Preferably, the control unit 124 maintains multiple entries in the prediction history storage 108 each associated with a different ring-3 process identified by a unique ring-3 identifier. In one embodiment, the ring-3 process is identified by its x86 process-context identifier (PCID), such as described in section 4.10, on pages 4-46 through 4-62 of Volume 3A of the Intel 64 and IA-32 Architectures Software Developer's Manual mentioned above. In another embodiment, the ring-3 process is identified by the address of the page directory used by the ring-3 process, which is loaded into the x86 CR3 control register. In one embodiment, the control unit 124 maintains the prediction history storage 108 as a first-in-first-out buffer. In another embodiment, the control unit 124 employs a more sophisticated replacement policy, such as least-recently-used or least-frequently-used. Preferably, the saving of the prediction histories 132 to the prediction history storage 108 is performed while the functional units of the microprocessor 100 continue to process instructions of the ring-0 thread, and the ring-0 thread execution time is likely to be longer than the prediction history save time. However, advantageously, there is no contention for access to the read and write ports of the storage arrays that store the prediction histories 132 between the prediction history saving and the ring-0 instruction processing since the prediction history 132 arrays are not being accessed (i.e., written) to accumulate prediction history or make predictions (i.e., read) to process the ring-0 instructions but only are being read to save the prediction history. This is advantageous because the amount of additional hardware needed to accommodate the saving of the prediction history is minimized because there is no need to include additional read ports on the storage arrays for that purpose. Flow proceeds to block 232.

At block 232, the control unit 124 detects an event that instructs the microprocessor 100 to operate at a user privilege level, e.g., ring 3, and to transfer control to a different thread than the currently running thread. Flow proceeds to block 433.

At decision block 433, the control unit 124 determines whether the new ring-3 thread to which control is being transitioned and the old ring-3 thread from which control was transitioned at block 212 are part of the same process. As discussed above with respect to block 413, the control unit 124 may make this determination by comparing the process identifiers associated with the two threads, such as the x86 PCID. If the new ring-3 thread process is different from the old ring-3 thread process, flow proceeds to block 435; otherwise, flow proceeds to block 242.

At block 435, the control unit 124 restores the prediction histories 132 for the new ring-3 process from the prediction history storage 108. That is, the control unit 124 uses the new ring-3 process identifier to find its prediction histories in the prediction history storage 108 and loads the prediction histories 132 of the predicting units 109 from the prediction history storage 108 based on the ring-3 process identifier. Preferably, the restoring of the prediction histories 132 from the prediction history storage 108 is performed while the functional units of the microprocessor 100 continue to process instructions of the microcode that performs the transition from ring 0 to ring 3. The execution time of the microcode may be a significant number of clock cycles and may be longer than the time required to perform the restore of the prediction histories 132, which may be advantageous since there may be little or no contention for access to the read and write ports of the prediction history 132 storage arrays between the ring transition microcode and the prediction history restoring since many of the prediction history 132 arrays are not being accessed (i.e., written) to accumulate prediction history or make predictions (i.e., read) to process the ring-0 instructions but only to restore the prediction history. For example, in one embodiment, the microcode unit does not employ the branch prediction unit 102, i.e., the branch prediction unit 102 does not make predictions for microcode instructions. For another example, in one embodiment, the ring transition microcode does not access system memory; therefore, the data prefetch unit 104 does not need to make data prefetches for the ring transition microcode and the store collision prediction unit 106 does not need to make predictions for the ring transition microcode. This is advantageous because the amount of additional hardware needed to accommodate the restoring of the prediction history is minimized because there is no need to include additional write ports on the storage arrays for that purpose. Flow proceeds to block 242.

At block 242, the predicting units 109 resume accumulating their respective prediction histories 132 and making dynamic predictions using the prediction history 132 as the microprocessor 100 is processing instructions. Flow ends at block 242.

Advantageously, the processing of instructions of the new ring-3 thread is not polluting the prediction histories 132 associated with the old ring-3 thread, which may result in greater prediction accuracy for both ring-3 threads.

Other embodiments are contemplated in which the embodiments of FIG. 3 and FIG. 4 are effectively combined such that the control unit 124 saves and restores the prediction histories 132 associated with ring-0 threads for which the control unit 124 decides not to suspend accumulating and using the prediction histories 132, e.g., for relatively long ring-0 threads and/or for ring-0 threads that merit accumulating and using the prediction histories 132 based on the effectiveness of the predictions made during previous execution instances of the ring-0 thread and/or the ring-3 process. As noted above, the time required for the microprocessor 100 to transition from ring 3 to ring 0 and vice versa may be a substantial number of clock cycles during which there is no need to accumulate the prediction histories 132 nor to make predictions using them; therefore, during this time the control unit 124 may save/restore the relevant prediction histories 132 to/from the prediction history storage 108 effectively without significant, if any, performance penalty. In such embodiments it may be particularly advantageous to limit the amount of prediction history 132 saved and restored to an amount that may be saved and restored during the ring 0 to ring 3 and ring 3 to ring 0 transitions in order to be able to avoid stopping instruction execution by the microprocessor 100 until the save and restore is complete.

Additionally, although embodiments are described in which the microprocessor 100 selectively suspends accumulation of the prediction history and its use to make predictions in response to thread transitions from one privilege level to a different privilege level, other embodiments are contemplated in which the microprocessor 100 selectively suspends or resumes accumulation of the prediction history and its use to make predictions in response to thread transitions within the same privilege level. For example, the microprocessor 100 may detect a thread transition by detecting an event that does not involve a privilege level change and decide to suspend or resume accumulation of the prediction history and it use to make predictions in response. For example, the microprocessor 100 may simply detect the execution of an instruction (such as a subroutine call or return instruction) at a particular IP value, and in some instances with a particular value of other architectural state, such as general purpose register values. For another example, the microprocessor 100 may detect a sequence of instructions and/or IP values.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device that may be used in a general-purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

The invention claimed is:

1. A microprocessor, comprising:
a predicting unit;
a control unit, configured to:
control the predicting unit to accumulate a history of characteristics of instructions executed by the microprocessor and make predictions related to subsequent instructions based on the history while the microprocessor is running a first thread;
detect a transition from running the first thread to running a second thread distinct from the first thread; and
control the predicting unit to selectively suspend accumulating the history and making the predictions using the history while running the second thread; and
wherein the predicting unit is further configured to make predictions without using the history while running at a second privilege level.

2. A microprocessor, comprising:
a predicting unit;
a control unit, configured to:
control the predicting unit to accumulate a history of characteristics of instructions executed by the microprocessor and make predictions related to subsequent instructions based on the history while the microprocessor is running a first thread;
detect a transition from running the first thread to running a second thread distinct from the first thread; and
control the predicting unit to selectively suspend accumulating the history and making the predictions using the history while running the second thread; and
wherein the control unit is configured to control the predicting unit to selectively suspend accumulating the history and making the predictions using the history while running the second thread based on a privilege level at which the second thread runs.

3. The microprocessor of claim 2, wherein the control unit is configured to control the predicting unit to selectively suspend accumulating the history and making the predictions using the history while running the second thread based on whether the second thread runs at a supervisor privilege level.

4. A microprocessor, comprising:
a predicting unit;
a control unit, configured to:
control the predicting unit to accumulate a history of characteristics of instructions executed by the microprocessor and make predictions related to subsequent instructions based on the history while the microprocessor is running a first thread;
detect a transition from running the first thread to running a second thread distinct from the first thread; and
control the predicting unit to selectively suspend accumulating the history and making the predictions using the history while running the second thread; and
wherein the control unit is configured to control the predicting unit to selectively suspend accumulating the history and making the predictions using the history while running the second thread based on whether or not the second thread is an interrupt handler.

5. The microprocessor of claim 4, wherein the control unit is configured to control the predicting unit to selectively suspend accumulating the history and making the predictions using the history while running the second thread based on whether or not the second thread is a system management interrupt handler.

6. A microprocessor, comprising:
a predicting unit;
a control unit, configured to:
control the predicting unit to accumulate a history of characteristics of instructions executed by the microprocessor and make predictions related to subsequent instructions based on the history while the microprocessor is running a first thread;
detect a transition from running the first thread to running a second thread distinct from the first thread; and
control the predicting unit to selectively suspend accumulating the history and making the predictions using the history while running the second thread; and
wherein the control unit is configured to control the predicting unit to selectively suspend accumulating the history and making the predictions using the history while running the second thread based on whether the transition was made in response to execution of a system call instruction by the first thread to cause the microprocessor to run the second thread.

7. A microprocessor, comprising:

a predicting unit;
a control unit, configured to:
control the predicting unit to accumulate a history of characteristics of instructions executed by the microprocessor and make predictions related to subsequent instructions based on the history while the microprocessor is running a first thread;
detect a transition from running the first thread to running a second thread distinct from the first thread; and
control the predicting unit to selectively suspend accumulating the history and making the predictions using the history while running the second thread; and
wherein the control unit is configured to control the predicting unit to selectively suspend accumulating the history and making the predictions using the history while running the second thread based on information gathered for a previous execution instance of the second thread.

8. The microprocessor of claim 7, wherein the information gathered for the previous execution instance of the thread comprises a number of instructions retired by the microprocessor during the previous execution instance of the second thread.

9. The microprocessor of claim 7, wherein the information gathered for the previous execution instance of the second thread indicates effectiveness of static predictions made by the predicting unit during the previous execution instance of the second thread.

10. The microprocessor of claim 9, wherein the information gathered for the previous execution instance of the second thread indicates effectiveness of static predictions made by the predicting unit during the previous execution instance of the second thread and the predictions made by the predicting unit during a previous execution instance of the first thread.

11. A microprocessor, comprising:
a predicting unit;
a control unit, configured to:
control the predicting unit to accumulate a history of characteristics of instructions executed by the microprocessor and make predictions related to subsequent instructions based on the history while the microprocessor is running a first thread;
detect a transition from running the first thread to running a second thread distinct from the first thread; and
control the predicting unit to selectively suspend accumulating the history and making the predictions using the history while running the second thread; and
wherein the control unit is configured to control the predicting unit to selectively suspend accumulating the history and making the predictions using the history while running the second thread based on an identity of the second thread.

12. The microprocessor of claim 11, wherein the control unit is further configured to determine the identity of the second thread based on one or more of the following list: a type of event that caused the transition, architectural state of the microprocessor when the event is detected, and a combination thereof.

13. The microprocessor of claim 12, wherein the type of event that caused the transition is from the following list of event types: execution of a system call instruction, execution of a software interrupt instruction, execution of an inter-privilege or task switch procedure call, and detection of an exception condition.

14. The microprocessor of claim 12, wherein the architectural state of the microprocessor when the event is detected is from the following list of architectural state: one or more values of general purpose registers of the microprocessor, one or more values of model specific registers of the microprocessor, a value of an instruction pointer register of the microprocessor, a value of an interrupt vector of the microprocessor, and a combination thereof.

15. A microprocessor, comprising:
a predicting unit;
a control unit, configured to:
control the predicting unit to accumulate a history of characteristics of instructions executed by the microprocessor and make predictions related to subsequent instructions based on the history while the microprocessor is running a first thread;
detect a transition from running the first thread to running a second thread distinct from the first thread; and
control the predicting unit to selectively suspend accumulating the history and making the predictions using the history while running the second thread;
a storage for storing instances of the history from the predicting unit; and
wherein the control unit is further configured to:
control the predicting unit to store a first instance of the history from the predicting unit to the storage in response to the first transition;
detect a second transition from running the second thread to running a third thread;
control the predicting unit to load a second instance of the history from the storage to the predicting unit in response to the second transition; and
control the predicting unit to resume accumulating the history and making the predictions using the second instance of the history while running the third thread.

16. The microprocessor of claim 15, wherein the control unit is configured to control the predicting unit to not load the second instance of the history from the storage to the predicting unit if the first and third threads are part of a same process that was interrupted from running by the first transition.

17. The microprocessor of claim 16, wherein to determine whether the first and third threads are part of the same process, the control unit determines whether a process identifier of the first thread and a process identifier of the third thread are the same.

18. The microprocessor of claim 17, wherein the process identifier comprises an x86 process-context identifier (PCID).

19. The microprocessor of claim 16, wherein to determine whether the first and third threads are part of the same process, the control unit determines whether a page directory address of the first thread and a page directory address of the third thread are the same.

20. A method for operating a microprocessor, the method comprising:
accumulating a history of characteristics of instructions executed by the microprocessor and making predictions related to subsequent instructions based on the history while the microprocessor is running a first thread;

detecting a transition from running the first thread to running a second thread distinct from the first thread; and selectively suspending accumulating the history and making the predictions using the history while running the second thread; and making predictions without using the history while running at a second privilege level.

21. A method for operating a microprocessor, the method comprising:

accumulating a history of characteristics of instructions executed by the microprocessor and making predictions related to subsequent instructions based on the history while the microprocessor is running a first thread;

detecting a transition from running the first thread to running a second thread distinct from the first thread;

selectively suspending accumulating the history and making the predictions using the history while running the second thread; and wherein said selectively suspending accumulating the history and making the predictions using the history while running the second thread is based on a privilege level at which the second thread runs.

22. A method for operating a microprocessor, the method comprising:

accumulating a history of characteristics of instructions executed by the microprocessor and making predictions related to subsequent instructions based on the history while the microprocessor is running a first thread;

detecting a transition from running the first thread to running a second thread distinct from the first thread;

selectively suspending accumulating the history and making the predictions using the history while running the second thread; and wherein said selectively suspending accumulating the history and making the predictions using the history while running the second thread is based on whether or not the second thread is an interrupt handler.

23. A method for operating a microprocessor, the method comprising:

accumulating a history of characteristics of instructions executed by the microprocessor and making predictions related to subsequent instructions based on the history while the microprocessor is running a first thread;

detecting a transition from running the first thread to running a second thread distinct from the first thread;

selectively suspending accumulating the history and making the predictions using the history while running the second thread; and wherein said selectively suspending accumulating the history and making the predictions using the history while running the second thread is based on whether the transition was made in response to execution of a system call instruction by the first thread to cause the microprocessor to run the second thread.

24. A method for operating a microprocessor, the method comprising:

accumulating a history of characteristics of instructions executed by the microprocessor and making predictions related to subsequent instructions based on the history while the microprocessor is running a first thread;

detecting a transition from running the first thread to running a second thread distinct from the first thread;

selectively suspending accumulating the history and making the predictions using the history while running the second thread; and wherein said selectively suspending accumulating the history and making the predictions using the history while running the second thread is based on information gathered for a previous execution instance of the second thread.

25. The method of claim 24, wherein the information gathered for the previous execution instance of the thread comprises a number of instructions retired by the microprocessor during the previous execution instance of the second thread.

26. The method of claim 24, wherein the information gathered for the previous execution instance of the second thread indicates effectiveness of static predictions made during the previous execution instance of the second thread.

27. A method for operating a microprocessor, the method comprising:

accumulating a history of characteristics of instructions executed by the microprocessor and making predictions related to subsequent instructions based on the history while the microprocessor is running a first thread;

detecting a transition from running the first thread to running a second thread distinct from the first thread;

selectively suspending accumulating the history and making the predictions using the history while running the second thread; and wherein said selectively suspending accumulating the history and making the predictions using the history while running the second thread is based on an identity of the second thread.

28. A method for operating a microprocessor, the method comprising:

accumulating a history of characteristics of instructions executed by the microprocessor and making predictions related to subsequent instructions based on the history while the microprocessor is running a first thread;

detecting a transition from running the first thread to running a second thread distinct from the first thread;

selectively suspending accumulating the history and making the predictions using the history while running the second thread;

storing a first instance of the history to a storage of the microprocessor in response to the first transition;

detecting a second transition from running the second thread to running a third thread;

loading a second instance of the history from the storage in response to the second transition and using the second instance of the history to make predictions while running the third thread; and resuming accumulating the history and making the predictions using the second instance of the history while running the third thread.

29. The method of claim 28, further comprising:

not loading the second instance of the history from the storage if the first and third threads are part of a same process that was interrupted from running by the first transition.

* * * * *